United States Patent Office 3,464,440
Patented Sept. 2, 1969

3,464,440
METHOD AND APPARATUS FOR PROTECTING A PUMP FROM FLOW RATE OVERLOADS
Günter Oskar Nordt, Hulsenbusch, Germany, assignor to H. Schroeder & Co., Elbach, Kalkkuhl, near Engelskirchen, Rhineland, Germany, a German firm
Filed Mar. 16, 1967, Ser. No. 623,725
Claims priority, application Germany, Mar. 18, 1966, Sch 38,692
Int. Cl. F16k 5/12; F04b 49/02
U.S. Cl. 137—529    5 Claims

ABSTRACT OF THE DISCLOSURE

A throttling valve is placed in the outlet conduit of a pump to automatically increase the resistance of the conduit to a very high value when the flow rate of fluid in the conduit exceeds a predetermined level. The throttling valve contains two springs which normally urge a valve cone away from its throttling position in opposition to fluid flow therethrough. One of the springs compresses more easily than the other and controls the position of the valve cone within the normal range of fluid flow rates through the valve. The other spring, which is stronger than the first, is actuated when the fluid flow rate through the valve exceeds a predetermined level, and this spring allows the valve cone to approach its throttling position in such manner as to rapidly increase the resistance of the conduit to a very high level after the predetermined fluid flow rate has been exceeded.

---

This invention relates to a method and apparatus for limiting the flow produced by a centrifugal pump as a protection against overload by means of a throttle valve in the outlet conduit of the pump.

Background of the invention

In a centrifugal pump, an overload may occur, for example, when a boiler plant is started up and the pressure valve and the regulating valve which are connected to the outlet side of the pump are not closed. In these cases, it has only been possible in the past to protect the electrical circuit of the pump motor or to provide against overload by means of shear pins. Such a protection, however, results in the shut-down of the supply plant when the pump motor is overloaded. This, of course, is highly undesirable and results in a loss of valuable time and/or material whenever a transient overload occurs.

Summary of the invention

It is the object of this invention to protect the driving motor of a centrifugal pump from overloads in such a manner that the protection of the motor against overload is achieved only in the hydraulic system of the pump. The invention provides means for limiting the maximum flow produced by the centrifugal pump in such a manner that the pump and its driving motor cannot be overloaded by a sudden rise in fluid output. This is achieved according to the invention by causing a drop of pressure in the pump outlet conduit to a predetermined magnitude when the flow rate exceeds a predetermined quantity by rapidly increasing the resistance of the outlet conduit to a high level and then automatically restoring the original resistance when the flow rate is reduced to its operational value. It is preferable to increase the resistance of the outlet conduit when the flow rate increases to up to 50%.

In accordance with the method of this invention, the pump output pressure remains almost constant, or increases only slightly, up to a selected magnitude, effectively up to the required maximum flow rate. When the flow rate increases further, the resistance increases to a maximum, so that the entire pressure of the pump is absorbed in the throttling valve before the highest possible flow rate is reached. An undesired increase in the flow, therefore, is effectively prevented. This also means that an undesired increase in the driving energy cannot occur. An overload of the driving motor is thus prevented, so that the plant remains in constant operation. Moreover, this regulating action is achieved automatically with a simple throttling valve.

The apparatus of this invention is preferably so constructed that in a throttling valve arranged in the outlet conduit of the pump, the valve cone is supported in a casing, for example, the cone guide which is located in the direction of flow after said cone, by means of springs having different compressibilities and acting sequentially. One of the springs is compressible within the range of the operational flow rates, while the other spring is considerably stiffer in order to support a large increase in pressure.

Such an automatically operating throttling valve may be inserted as a separate unit into the outlet conduit of a centrifugal pump. The device according to the invention, however, may also be effectively arranged inside the casing of a bypass back pressure valve.

Description of the preferred embodiments

Figure 1:
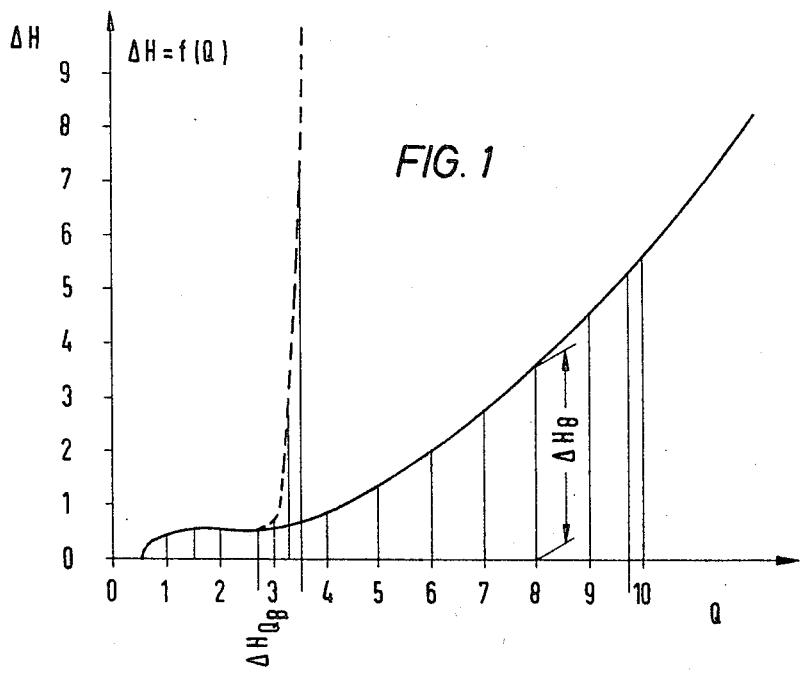
FIG. 1 is a curve showing the drop in pressure as a function of flow rate in a by-pass-back pressure valve of the usual type as disclosed in this invention.

In a by-pass-back pressure valve of a known construction, selected by way of example, having a back pressure cone which is freely movable in the direction of flow and provided with throttles arranged in series having different cross-sections, the function shown in FIG. 1 results regarding the drop in pressure as a function of flow rate, i.e. $\Delta H = f(Q)$.

In the known by-pass-back pressure valves, when the cone is in the extreme upper position, the cross-section F of the opening for the free flow must be relatively large, in order to minimize the resistance. If the flow rate Q is to be limited in such an arrangement, either a very large drop in pressure at this point has to be accepted, or the maximum possible flow rate $Q_{max}$ of the pump has to be considerably larger than the operational flow rate $Q_B$, since the drop in pressure $\Delta H$ increases only according to the function $$\Delta H = \frac{\zeta \times Q^2}{2g \times F^2} \to \frac{1}{K} = \zeta Q^2$$

wherein Q is the flow rate, g the acceleration due to gravity, $\zeta$ the resistance, and F the cross-section of the opening = constant.

Figure 2:
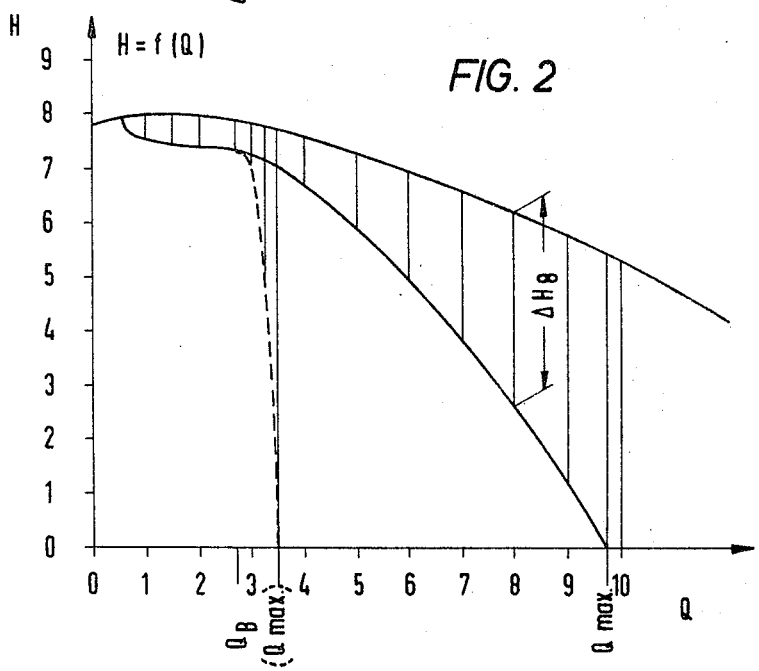
FIG. 2 is a curve showing the output pressure of a centrifugal pump as a function of flow rate.

FIG. 2 shows the function $H = f(Q)$, for example, of a centrifugal pump. If the corresponding coordinates in FIG. 1 are taken from the Q–H curve, one can obtain the Q–H curve measurable after the by-pass-back pressure valve. The flow-rate is limited to the value given by the bisection of this curve with the x-axis.

In the device according to the invention, the cross-section F of the opening for the free flow is reduced when the operational flow rate $Q_B$ is exceeded, so that the drop in pressure increases according to the following function:

$$\Delta H = \frac{\zeta \times Q^2}{2g \times F^2}$$

$F-f(h) \neq$ constant; $h$=stroke of cone. In FIGS. 1 and 2 the curve of the drop in pressure and the Q–H curve of the device according to the invention are shown, by way of example, by dashed lines.

Figure 3:
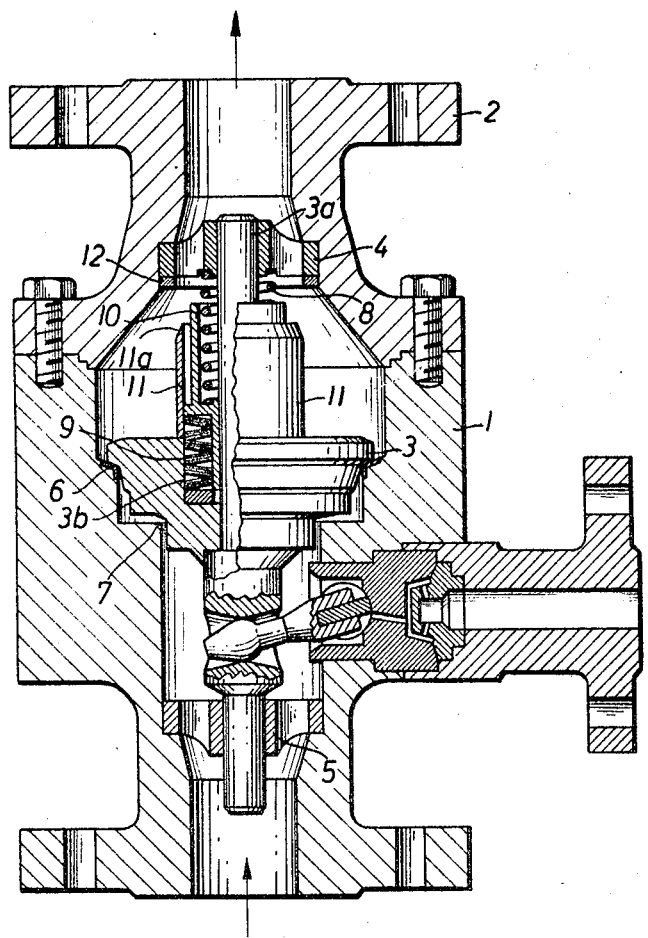
FIG. 3 is a cross-sectional view of a by-pass-back pressure valve containing a throttling valve according to the invention.

In a by-pass-back pressure valve comprising a base part 1 and a top part 2, as shown in FIG. 3, the valve cone 3 is freely movable on the valve axle and supported in the top and base parts by the guides 4 and 5. The valve cone 3 is so constructed that two throttling positions 6 and 7 result in relation to the casing 1. The cone is influenced by the action of the springs 8 and 9 which are arranged in sequence. The spring 8 rests, on the one hand, against the stationary top guide 4 and, on the other hand, against a spacer sleeve 10 which is movable on the shaft 3a of the valve cone 3. The spring 9 is considerably stronger than the spring 8 and is held between the sleeve 10 and a corresponding recess 3b in the cone 3. Plate springs may be used for the spring 9. A further sleeve 11 is provided, the free end of which is sloped at 11a to interact with the throttling position 12 at the top guide 4.

When a liquid, for example, water, is delivered by the valve in the direction of the arrows in FIG. 3, the cone 3 is lifted. The height of the stroke $h$ depends on the flow rate $Q$ in such manner that for each flow rate only one position of the cone is possible. In the range of the operational flow rate $Q_B$, the spring 8 is principally compressed, since it is preferably easily compressible, so that the drop in pressure $\Delta H$ is kept at a minimum in this range of stroke. At a further increase in the flow rate $\Delta Q$, the spring 8 can be compressed, for example, only 1 mm. further. Thereafter, the spacer sleeve 10 rests against the top cone guide 4. When the components are in this position, the cone 3 is away from the throttling positions 6 and 7. In this position the cone is held by the throttling position 12.

At a still further increase in the flow rate, the throttling gap between the throttling edge 11a and the top guide 4 is reduced by the lifting movement of the cone 3 against the compression of the spring 9, so that the resistance of the valve increases substantially according to a selected exponential function which depends on the compressibility of the spring and on the reduction of the cross-section. The compressibility of the spring 9 and the throttling effect are preferably chosen in such relation to each other, that at reduction of the flow rate, the cone 3 opens this smallest cross-section before the operational flow rate is reached.

The slopes 11a are preferably curved, for example, in a parabola or the like.

Although this invention has been described with reference to one specific embodiment thereof, it should be understood that the invention is by no means limited to the disclosed embodiment, but rather includes all embodiments falling within the scope of the attached claims.

What is claimed is:

1. A valve device for controlling the pressure of liquid in a line as a function of flow rate of the liquid comprising, in combination,
   (a) a valve cone,
   (b) a first biasing means located on the downstream side of said valve cone and having a slight biasing force against said flow rate,
   (c) a second biasing means located on the downstream side of said valve cone and having a considerably stronger biasing force against said flow rate than said first biasing means,
   (d) said first and second biasing means operating sequentially upon said valve cone, said first biasing means acting alone to resist valve cone movement during initial, low flow rate conditions and said second biasing means acting together with said first biasing means to resist valve cone movement during subsequent, higher flow rate conditions,
   (e) said valve cone includes a main throttling portion located at the valve inlet side of the device and a sleeve throttling portion acting on the valve outlet side of the device in correlation with the second biasing means,
   (f) said main throttling portion acts to restrict flow only during said initial, low flow rate conditions and said sleeve throttling portion acts to restrict flow only during said subsequent, high flow rate conditions.

2. A valve device as defined in claim 1 including a sleeve surrounding said first biasing means and being in movable contact with the inside of said sleeve throttling portion.

3. A valve device as defined in claim 2 wherein
   said sleeve throttling portion has a ring-shaped free end being sloped in its axial cross-sectional dimension,
   said sloped free end throttling said liquid flow when in co-action with the outlet side of said valve.

4. A valve device as defined in claim 3 wherein said first biasing means includes a helical spring.

5. A valve device as defined in claim 4 wherein said second biasing means includes a plate spring.

References Cited
UNITED STATES PATENTS

| | | | |
|---|---|---|---|
| 2,619,115 | 11/1952 | Dondero et al. | 103—21 X |
| 2,682,227 | 6/1954 | Burris | 103—40 |
| 3,194,255 | 7/1965 | Flaton et al. | 137—529 X |
| 3,123,093 | 3/1964 | Akerman et al. | 137—529 X |
| 3,157,191 | 11/1964 | Garret et al. | 137—529 X |
| 3,294,024 | 12/1966 | Meyers et al. | 103—21 |
| 3,318,321 | 5/1967 | Odendahl | 103—41 X |
| 3,373,689 | 3/1968 | Brunson | 103—42 |

DONLEY J. STOCKING, Primary Examiner

WARREN J. KRAUSS, Assistant Examiner

U.S. Cl. X.R.

103—21, 40